Patented Nov. 9, 1948

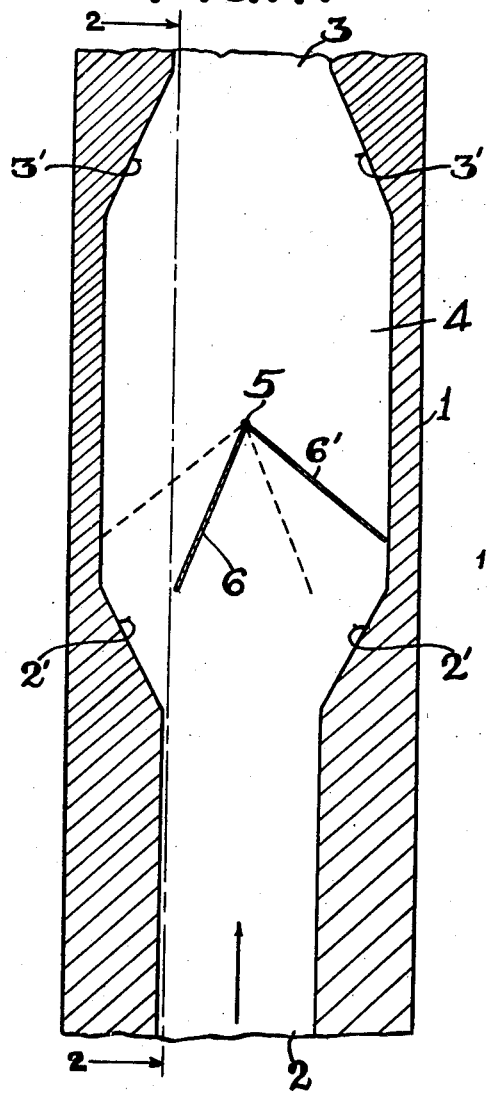
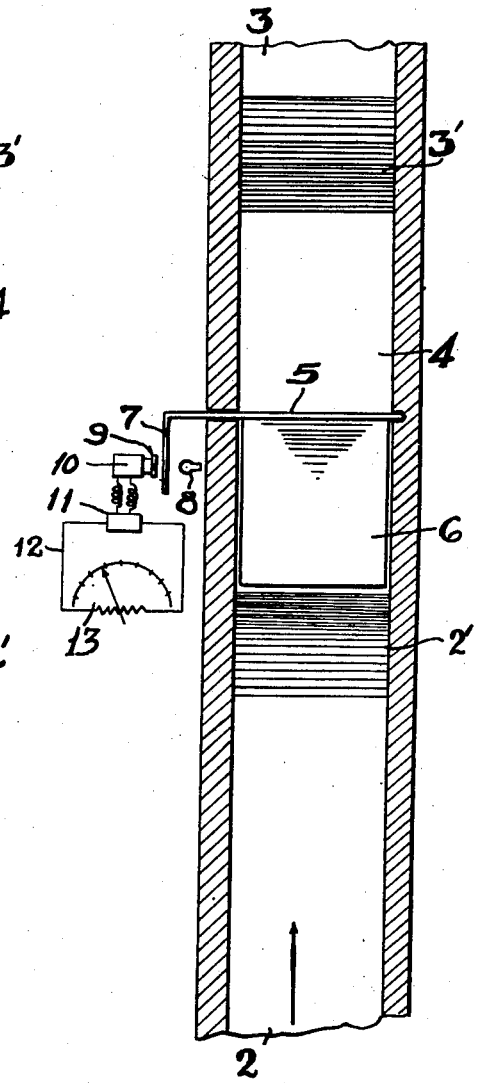

2,453,376

UNITED STATES PATENT OFFICE 2,453,376

MEANS FOR MEASURING THE VELOCITY AND VOLUME OF FLUIDS

Francis H. Lagasse, San Francisco, Calif.

Application November 21, 1944, Serial No. 564,508

3 Claims. (Cl. 73—194)

1

This invention relates to improvements in meters used in measuring the velocity and volume of fluids.

With the various types of meters now commonly used an accurate measuring of the velocity or volume of fluids passing through a tube at low velocities is not possible, principally because a certain amount of head pressure is usually required to overcome the friction accompanying the movement of a meter's operating parts. Slippage of certain fluid particles through the meter without reacting upon or causing the movement of its operating parts, is another phenomena which contributes to the inaccuracy of such meters.

An object of the present invention is to provide a novel meter having a simplified construction wherein there is but one delicately balanced moving part arranged in such a manner as to react with a high degree of sensitivity to the flow of fluid particles through the meter.

Another object of my invention is to provide an improved meter embodying a simplified construction wherein friction is reduced to a minimum and which is highly responsive to the increase or decrease in the volume of fluid passing through the meter and to a change in the velocity thereof.

Other and further objects of my invention will be pointed out hereinafter, or will be indicated in the appended claims, or will be obvious to one skilled in the art upon an understanding of the present disclosure. For the purpose of this application I have elected to show herein certain forms and details of a meter for measuring the velocity and volume of flowing fluids representative of my invention; it is to be understood, however, that the embodiment of my invention herein shown and described is for the purpose of illustration only, and that therefore it is not to be regarded as exhaustive of the variations of the invention.

In the accompanying drawings illustrating the preferred embodiments of my invention—

Fig. 1 is an enlarged longitudinal section taken axially through a meter particularly adapted to measure the volume and velocity of fluids which are drawn through the meter by suction pressure; and Fig. 2 is a sectional view taken on the line 2—2 of Fig. 1.

Referring to the drawings, the numeral 1 designates a suitably shaped casing or housing, preferably rectangular in cross section, having an inlet 2 and an outlet 3. The inlet and outlet are also preferably rectangular in cross section, but each has a substantially narrower width than the

2 width of the interior of the housing 1. The housing 1 encloses a suitably shaped and proportioned chamber 4 which is connected at its opposite ends to the inlet and outlet. Arranged at opposite ends of the chamber 4 where the inlet 2 and the outlet 3 joins the housing 1, are oppositely inclined surfaces 2' and 3' which are arranged to effect the free flow of a fluid into and from the chamber without restrictions, eddies or other disturbing factors. While the chamber 4 and its inlet 2 and outlet 3 may embody other suitable forms, it has been found that rectangular shapes and constructions are preferable since there is a substantial absence of undesirable interferences or disturbances to the free flow of a fluid into, through and from a meter chamber embodying this particular shape.

Secured to a pivoted shaft 5, which extends centrally through the narrower dimension of the chamber 4 and is supported in suitable bearings provided in the housing 1, is a butterfly which preferably embodies a structure having two angularly disposed rectangular blades 6 and 6'. The blades 6 and 6' are arranged at a suitable angle with respect to one another, preferably 60 degrees, and each is of sufficient length to engage with the side of the housing 1 located nearest it. The blades are arranged in positions whereby they extend in diverging directions from the shaft toward the inlet 2, thereby having the flow of the fluid coming into the V rather than being diverted in opposite directions thereby. The blades 6 and 6' of the butterfly, when the latter oscillates to its extreme positions, extend beyond the longitudinal planes which are defined by the opposite sides of the inlet opening 2.

When fluid is drawn through the chamber 4 by suitable suction means in the direction indicated by the arrows (Figs. 1 and 2), the butterfly will oscillate back and forth from a position shown by the full lines (Fig. 1) to a position indicated by the broken lines. The speed at which the butterfly oscillates varies in accordance with the velocity of the fluid flowing through the chamber 4. At the commencement of the butterfly's oscillation and when a sudden suctional pressure is impressed upon the fluid in the chamber 4, there is set up temporary eddies and disturbances around the butterfly which immediately move it from an off center position to one side or the other. When the butterfly is moved, say, in a counterclockwise direction, the blade 6' moves in the same direction until it engages with the side of the housing 1. This movement is of a positive character because of the greater net pressure on the blade 6' than there is on the blade 6, this difference in pressure being due to the unequal forces exerted on the said blades by the fluid pressure set up in the chamber 4. When the blade 6' reaches the adjacent side of the housing, the suctional pressure thereon will fall to zero. In the meantime, the other blade 6 has moved away from its adjacent side of the housing, thereby leaving an opening or space for the fluid to pass through. There is an increased suctional pressure exerted on the blade 6 when there is no longer an opening between the blade 6' and the housing for the fluid to pass. A considerable amount of the fluid particles proceeding toward the blade 6 upon finding an opening at that side of the chamber 4 are drawn through the opening between the blade 6 and its adjacent side of the chamber, thereby exerting a suctional pressure upon the blade 6 in a direction which induces its movement in a clockwise direction. Those fluid particles proceeding toward the blade 6' strike against its inclined surface and are deflected against the inside surface of the blade 6, thereby also exerting a pressure thereon in a clockwise direction. With substantially all of the particles entering the chamber 4 being then drawn toward or through the opening between the side wall of the chamber and the blade 6, there will be exerted on the said blade a combination of forces which will pivotally move the butterfly in a clockwise direction to a position where the blade 6 contacts its adjacent side of the chamber. When such a position is reached by the blade 6 and there is no longer an opening between it and the housing for the fluid particles to pass, the suctional pressure on this blade reaches zero. In the meantime the blade 6' has moved away from the side of the housing and has thereby provided an opening through which the fluid may be drawn. Similar pressures, as above described with respect to the blade 6, are thereupon exerted upon the blade 6', thus causing the butterfly to oscillate in a reverse or counter-clockwise direction. A continued suctional pressure in the chamber will cause the butterfly to oscillate back and forth, thereby causing the shaft 5 to rotate first in one direction and then in the opposite direction.

There are several ways in which the oscillatory movement of the butterfly may be indicated or recorded, and one of them is diagrammatically shown by Fig. 2. Secured to the outwardly projecting end of the shaft 5 is an arm 7 which is arranged to move back and forth with the shaft. At one side of the path through which the arm 7 moves is positioned a suitable source of light 8. At the opposite side of said path and in line with the source of light 8 is a shield 9 having a small light opening. Positioned behind the shield 9 is a photo-electric cell 10 having a light receiving opening (not shown) which is in registry with the light opening in the shield. A relay 11 connected to the photo-electric cell 10 is also connected in a circuit 12. Suitable indicating means 13 connected in the circuit 12 is energized by the electrical impulses conducted to it each time the photo-electric cell 10 is excited. The breaking of the beam of light proceeding from the source of light 8 to the photo-electric cell 10 by the movement therebetween of the arm 7 will cause the indicating means 13 to indicate the oscillatory movement of the butterfly.

The length of the blades 6 and 6' are preferably slightly greater than their breadth. The length of each blade is greater than one-half the width of the chamber 4, thereby causing the blades when they assume engaging positions with respect to the walls of the chamber to be inclined in a manner whereby fluid particles striking thereon will be deflected inwardly toward that blade then positioned nearer the longitudinal axis of the chamber. Being delicately balanced, the butterfly responds immediately to changes in the velocity of a fluid passing through the chamber 4, and with an increase in velocity there is a speeding up in the oscillatory movement of the butterfly, while with a decrease in the velocity there will be a proportionately slower responsive movement of the butterfly. The butterfly should preferably be constructed from a light weight material which will reduce the forces of inertia to a minimum.

The best results are obtainable if the meter chamber 4 is arranged with its longitudinal axis located in a substantially vertical position, with the suction means arranged to draw the fluid upwardly therethrough. With the blades 6 and 6' of the butterfly suspended downwardly from the pivoted horizontally disposed shaft 5 there will not be developed any appreciable torque as the butterfly is actuated back and forth by the fluid passing upwardly through the chamber 4. With the butterfly suspended downwardly from the shaft the possibility of dirt or other foreign particles carried by the fluid lodging between the blades is reduced to a minimum.

Having described my invention, what I claim is:

1. In means for measuring the volume and velocity of fluids, a casing having an elongated chamber, a fluid inlet at one end and a fluid outlet at its opposite end, a rotatable shaft extending centrally across the chamber and arranged between the inlet and the outlet, an oscillatory member consisting of two angularly disposed blades arranged in converging relationship and secured at their converging ends to the shaft, the said blades being arranged to be actuated by the fluid passing through the chamber first in a direction where one blade engages with the side of the chamber and then in the opposite direction where the other blade engages the opposite side wall of the chamber.

2. In means for measuring the volume and velocity of fluids, a tubular casing having an inlet at one end, and an outlet at its opposite end, and an elongated chamber which is substantially rectangular in cross section, an oscillatory member pivotally mounted in the chamber between the inlet and the outlet and comprising two angular blades arranged in converging fixed relationship with their ends forming an apex, and each blade having a width slightly less than the width of the chamber and a length greater than half the width of the chamber, the said member being mounted with its apex pointing in a direction the fluid flows through the chamber and in a position extending centrally across the chamber, the said oscillatory member being pivotally mounted for oscillating movement about the apex and the said member being arranged to be pivotally actuated first in one direction and then in the opposite direction by the fluid pressure alternately increasing and decreasing on the blades.

3. In means for measuring the volume and velocity of fluids, a tubular casing having an inlet at one end, an outlet at its opposite end and an elongated chamber which is substantially rectangular in cross section, an oscillatory member pivotally mounted in the chamber between the inlet and the outlet and comprising two angular blades arranged in converging fixed relationship with their ends forming an apex and each blade having a width slightly less than the width of the chamber and a length greater than half the width of said chamber, the said member being mounted with its apex extending centrally across the chamber and pointed in the direction of the fluid flow, the said oscillatory member being pivotally mounted for oscillating movement about the apex and the said member being arranged to be pivotally actuated first in one direction and then in the opposite direction by fluid pressure alternately increasing and decreasing on the blades, a shaft rotatably extending across the chamber to which the oscillatory member is rigidly secured at its apex, and means associated with and responsive to the movement of the shaft for indicating the oscillating movement of the oscillatory member.

FRANCIS H. LAGASSE.

REFERENCES CITED

The following references are of record in the file of this patent:

UNITED STATES PATENTS

| Number | Name | Date |
|---|---|---|
| 12,887 | Taggart | May 15, 1855 |
| 20,842 | Darker | July 6, 1858 |
| 142,551 | Atwell | Sept. 9, 1873 |
| 203,812 | Austin | May 21, 1878 |
| 213,944 | Sanford | Apr. 1, 1879 |
| 1,104,688 | Mason | July 21, 1914 |
| 1,143,109 | Downey | June 14, 1915 |
| 1,935,445 | Heinz | Nov. 14, 1933 |
| 2,073,385 | Blocker | Mar. 9, 1937 |
| 2,333,791 | Hutchinson | Nov. 9, 1943 |